Jan. 17, 1956 K. F. McCANN 2,731,150
HORIZONTAL FILTER APPARATUS
Filed May 26, 1952 2 Sheets-Sheet 1

INVENTOR.
K. F. McCANN
BY
P. M. McKnight
ATTORNEY

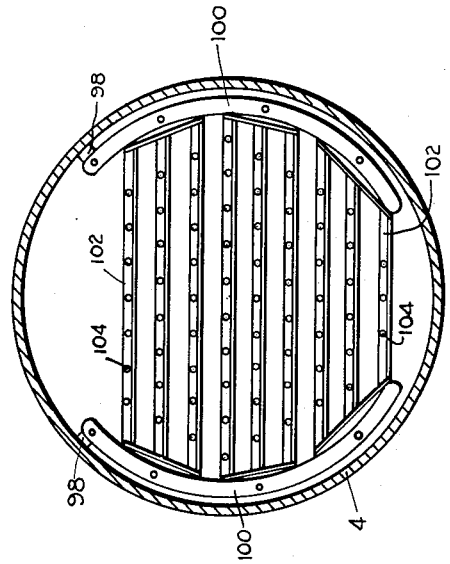
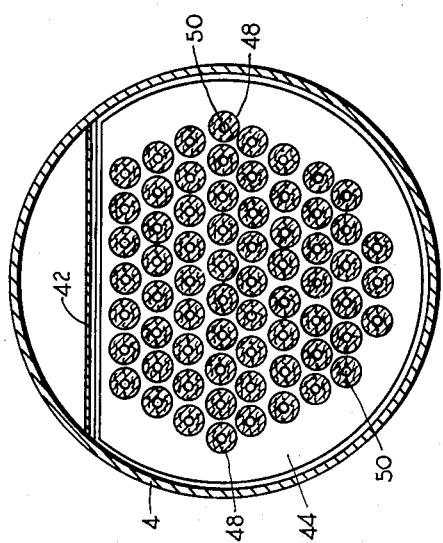
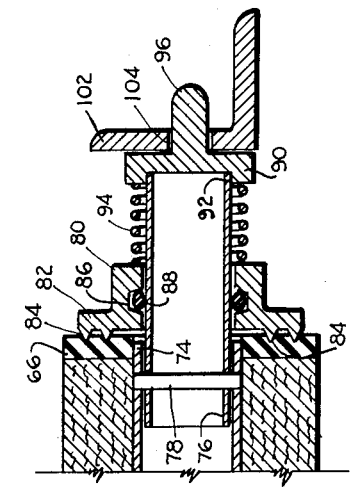
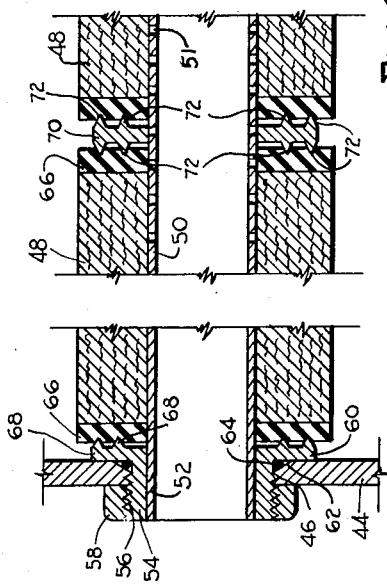

United States Patent Office 2,731,150
Patented Jan. 17, 1956

2,731,150

HORIZONTAL FILTER APPARATUS

Kelly F. McCann, Tulsa, Okla., assignor to Warner Lewis Company, Tulsa, Okla., a corporation of Delaware Application May 26, 1952, Serial No. 290,068

3 Claims. (Cl. 210—43)

This invention relates to improvements in liquid separators.

As it is well known in the oil industry, the oil and water separators are usually provided with a coalescing media, either in the form of a bundle of excelsior, or a series of baffles, or the like, to provide a separation of the oil and water globules. The oil and water are then separately removed from the separator for further processing. Ordinarily with the use of only one type of coalescing media, the oil and water globules will not be completely separated. Furthermore, the separated oil will be contaminated with various types of particles, such as sand, rust, and the like.

The present invention contemplates a novel separator wherein the mixture to be separated is initially passed through a coalescing media, such as a bundle of excelsior, and is then subsequently processed through a second media. The excelsior provides an initial separation of the oil and water globules, as well as filtering large contaminating particles from the mixture. The oil and water globules, as well as the remaining mixture of the two, is then passed through a series of baffles to further separate the oil and water globules. The combination of these two coalescing medias will provide a highly efficient separation of the oil and water. The separated water is then removed from the separator, whereas the separated oil is retained in the separator and forced through a filtering section to remove substantially all of the contaminating particles therefrom. As the separated oil enters the filtering section of the separator, it is moved through a tortuous path by a series of baffles to enhance the separation of particles. The separated oil is then forced through a plurality of surface type filter elements to completely remove all contaminating particles from the oil.

An important object of this invention is to provide a novel separator utilizing two types of coalescing media for separating a mixture into its constituent parts.

Another object of this invention is to provide a separator utilizing various types of separating and filtering means to provide the maximum separation for fluid passed through the separator, as well as to efficiently clean the fluid.

A further object of this invention is to provide a filtering section in an oil and water separator; and to arrange the filtering elements in the filtering section in such a position that large contaminating particles will not come in contact with the elements.

A further object of this invention is to provide the maximum separation and filtration of fluid in an oil and water separator.

A still further object of this invention is to provide a multiple chambered separator which may be economically manufactured.

Other objects and advantages of the invention will be evident from the following detailed description, read in conjunction with the accompanying drawings, which illustrate my invention.

In the drawings:

Figure 4 is a sectional view taken along lines 4—4 of Fig. 1.

Figure 5 is a sectional view taken along lines 5—5 of Fig. 1.

Figure 6 is an enlarged sectional view of one of the filters used in the separator shown in Fig. 1.

Figure 1:
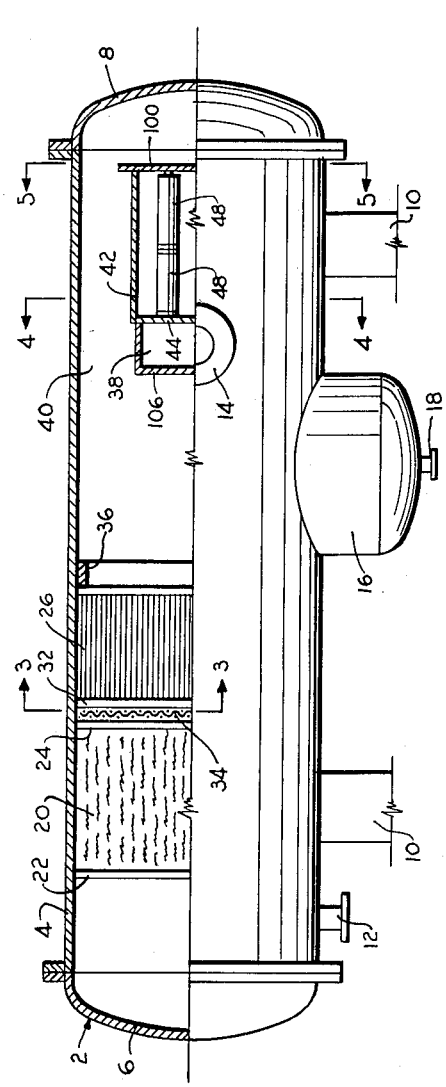
Figure 1 is a side elevational view of a novel separator partially in section for clarity.
Figure 2:
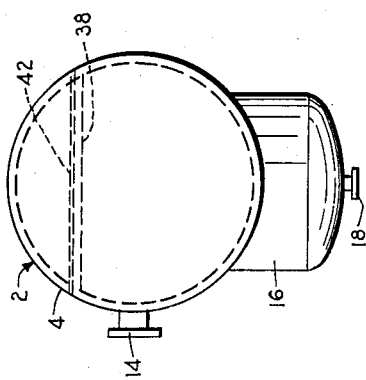
Figure 2 is an end elevational view of the separator shown in Fig. 1.

Referring to the drawings in detail, and particularly Figs. 1 and 2, reference character 2 generally designates a novel oil and water separator comprising a cylindrical shell 4 having removable end closure members 6 and 8 on the opposite ends thereof. The shell 4 is preferably supported in a horizontal position by suitable spaced supports 10. An inlet 12 adapted to be connected to a liquid flow line (not shown) is provided in the shell 4 adjacent the end closure member 6. In addition, an oil outlet 14 is provided in the shell 4 in proximity with the end closure member 8. The shell 4 is also provided with the usual water leg 16 between the inlet 12 and the oil outlet 14 and having a water outlet 18 therein.

Figure 3:
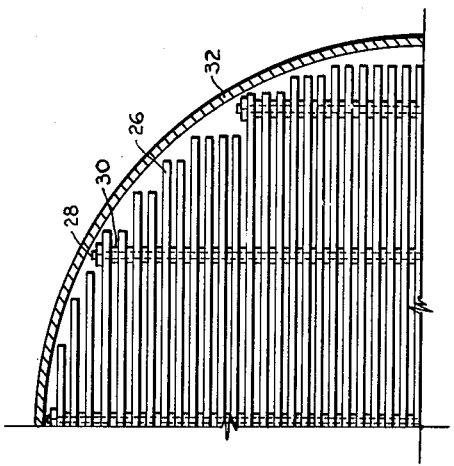
Figure 3 is a partial sectional view taken substantially along lines 3—3 of Fig. 1.

A cylindrical shaped repack 20 having grids 22 and 24 on the opposite ends thereof is disposed in the shell 4 adjacent the inlet 12. The repack 20 may be constructed of any suitable coalescing media, such as excelsior or the like, to provide an initial separation of the oil and water emulsion and to remove large contaminates from the emulsion, as will be more fully hereinafter set forth. A plurality of horizontally disposed and vertically spaced baffles 26 are provided in the shell 4 downstream of and adjacent to the repack 20. A plurality of tie rods 28 (see Fig. 3) extend vertically through the baffles 26 and have tubular shaped spacers 30 thereon between each pair of baffles 26 to retain the baffles in the desired position in the shell 4. A circular shaped screen 34 may be provided between the repack 20 and the adjacent end of the baffles 26 to prevent any possible discharge of the excelsior into the baffles, if desired. The repack 20 and baffles 26 are retained in the desired position in the shell 4 by a stop 36 in the form of a ring welded or otherwise rigidly secured to the shell.

A manifold or gathering box 38 is provided in the shell 4 downstream of the water leg 16 and directly opposite the oil outlet 14. The manifold 38 completely closes off the major portion of the shell 4, leaving only a passageway 40 thereabove for the flow of separated oil, as will be more fully hereinafter set forth. A horizontal baffle 42 is secured to the top of the manifold 38 and extends toward the end closure member 8. The baffle 42 extends completely across the shell 4 as is clearly shown in Fig. 4 and is secured to the inner periphery of the shell 4 in any suitable manner.

The downstream wall 44 of the manifold 38 is provided with a plurality of apertures 46 as shown in Fig. 6 and functions as a filter holding plate for a plurality of filter elements 48. The filter elements 48 are tubular in form and are preferably of the service type, constructed out of cotton, pleated paper or the like. In addition, the filter elements 48 are preferably provided in pairs and supported telescopically in end to end relation on a center tube 50 having a plurality of apertures (not shown) along the length thereof. The inner end 52 of each center tube 50 has a tubular shaped member 54 rigidly secured thereon. The tubular members 54 are of a size to extend through the apertures 46 and are provided with external threads 56 to receive suitable nuts 58. An external flange 60 is provided on the outer end of each tubular member 54 to cooperate with the nuts 58 for securing the center tubes 50 to the filter holding plate 44. The outer surface of the filter holding plate 44 is beveled at 62 around each of the apertures 46 to receive a sealing ring 64. It will be apparent that when the tubular members 54 are secured in the apertures 46, the sealing ring 64 will be compressed to provide a seal and prevent a flow of fluid between the outer periphery of the member 54 and the aperture 46.

Each of the filter elements 48 is also provided with an annular shaped gasket or sealing member 66 on the opposite ends thereof. A pair of concentric flanges 68 are provided on the outer face of the flange 60 to engage the adjacent gasket 66 and prevent a flow of fluid inwardly to the tube 50 between said gasket and the filter holding plate 44. The flanges 68 are preferably tapered to converge toward their outer end and facilitate the engagement thereof with the adjacent gasket 66. An annular shaped member 70 having concentric circumferential flanges 72 on each end face thereof is disposed on the center tube 50 between the filter elements 48. The flanges 72 are formed in the same manner as the flanges 68 to engage the gaskets 66 on the adjacent ends of the filter elements 48 to provide a seal and prevent a flow of fluid inwardly between the filter elements 48 to the center tube 50.

The outer end 74 of the center tube 50 terminates within the gasket 66 which is provided on the outer end of the outer filter element 48. A tubular shaped extension 76 is secured to the outer end 74 of the center tube 50 by a locking pin 78 and extends outwardly from the center tube 50 in aligned relationship therewith. A tubular shaped sealing member 80 is telescopically disposed on the extension 76 and is provided with an external flange 82 on one end thereof. The flange 82 is provided with a pair of concentric circumferential flanges 84 on the outer end face thereof. The flanges 84 are shaped in the same manner as the flanges 68 and 72 to engage the gasket 66 which is provided on the outer end of the outer filter element 48. In addition, an annular groove 86 is provided in the inner periphery of the member 80 to receive a sealing ring 88. The flanges 84 and adjacent gasket 66, in cooperation with the sealing ring 88, prevent a flow of fluid directly into the outer end 74 of the center tube 50. A locking nut 90 is welded or otherwise rigidly secured over the outer end 92 of the tubular extension 76. The nut 90 obviously prevents a flow of fluid directly into the outer end 92 of the extension 76, and hence, into the center tube 50. A helical spring 94 surrounds the extension 76 between the member 80 and the nut 90. The spring 94 continuously reacts on the nut 90 to urge the member 80 toward the filter holding plate 44 to retain the various flanges in contact with the adjacent gaskets 66 in the manner set forth above. A stud 96 extends outwardly from each locking nut 90 for purposes as will be hereinafter set forth.

A pair of brackets 98 are secured to the upper inner periphery of the shell 4 adjacent the end closure member 8 (see Figs. 1 and 5). A pair of arcuate arms 100 are secured at their upper ends to the brackets 98 and extend downwardly therefrom adjacent the inner periphery of the shell 4. Support members 102, preferably in the form of angle irons, are provided in groups of three and supported in a horizontal position at their opposite ends to the arms 100. Each support member 102 is provided with a plurality of apertures 104 to receive the studs 96 of the center tube locking nuts 90. Thus the members 102 support the outer ends of the center tubes 50 to retain the filter elements 48 in horizontal positions in the shell 4.

Operation

In operation of the separator 2, the oil and water emulsion is introduced through the inlet 12 into the end portion of the shell 4. As the emulsion flows through the repack 20, the oil and water globules are separated, or at least partially separated, whereupon the water, being heavier than the oil, gravitates to the lower portion of the shell 4. In addition to the separation of the oil and water globules, the repack 20 filters the larger contaminates from the emulsion.

The separated oil and water and the remaining emulsion then flow through the screen 34 into and over the horizontal baffles 26. The baffles 26 provide a further separation of the emulsion to provide a strata of oil in the upper portion of the shell 4 superimposed on a strata of water. The interfacial level of the oil and water will depend on the relationship of the oil and water in the original emulsion.

Upon discharge of the liquids from the baffles 26, the separated water is gathered in the water leg 16 for subsequent drainage through the water outlet 18. The oil, however, continues to flow through the upper portion of the shell 4 and a portion thereof contacts the forward wall 106 of the manifold 38. The wall 106 thus functions as a vertical baffle to direct the separated oil upwardly into the passageway 40. As the direction of flow is thus changed, a further separation of any remaining water globules in the oil is accomplished. The oil then flows through the passageway 40 over the horizontal baffles 42 into the end closure member 8. As the oil contacts the member 8, it is directed downwardly and back into the shell 4 toward the filter elements 48.

The oil then flows radially into and through the filter elements 48 and is gathered in the center tubes 50 through the apertures 51 for discharge into the manifold 38. As the oil is forced through the filter elements 48, any remaining contaminates are removed to provide an oil substantially free of water and all contaminating particles. The clean oil is subsequently discharged from the manifold 38 through the oil outlet 14 for storage or further processing.

Although I have described the separator 2 as being used for separating and filtering an oil-water emulsion, it will be understood that several other types of emulsion may be likewise separated with equal efficiency.

From the foregoing, it is apparent that the present invention provides a novel separator utilizing two types of coalescing media to provide the maximum separation of a mixture into its constituent parts. The separator is also provided with a filtering section arranged in such a position that large contaminating particles will not come in contact with the filter elements. The maximum separation and filtration of fluid is accomplished and the service life of the filtering elements will not be unduly limited.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An oil-water separator, comprising a horizontal shell having an inlet in one end thereof to receive a mixture of oil and water, a repack in the shell adjacent the inlet to separate the oil and water, a plurality of horizontal baffles in the shell downstream of the repack to further separate the oil and water, an outlet in the lower portion of the shell adjacent the baffles for the separated water, a vertical baffle extending transversely in the shell downstream of the horizontal baffles to direct the separated oil upwardly in the shell, a plurality of surface type filter elements supported in the shell downstream of the vertical baffle to filter the separated oil, and an outlet in the shell communicating with the filter elements for discharging the separated oil from the shell.

2. An oil-water separator, comprising a horizontal shell having an inlet in one end portion thereof to receive a mixture of oil and water, a bundle of excelsior in the shell adjacent the inlet to separate the oil and water and to remove large contaminating particles from the mixture, a plurality of horizontal baffles downstream of said bundle to further separate the oil and water, an outlet in the lower portion of the shell for the separated water, a manifold extending transversely in the shell downstream of said bundle to baffle the separated oil upwardly in the shell, said manifold having a side wall provided with a plurality of apertures therein, a plurality of tubular shaped filter elements supported in the shell with the inner bore of each filter element communicating with an aperture in the side wall, said filter elements communicating with the manifold and adapted to filter the separated oil for discharge into the manifold, and means for discharging the oil from the manifold.

3. In an oil and water separator comprising a horizontal shell having an inlet in one end portion for receiving a mixture of oil and water, an excelsior bundle adjacent the inlet for initial separation of the oil and water, a plurality of horizontal baffles disposed downstream of said bundle for continued separation, an outlet in the lower portion of the shell for the separated water, a vertical baffle disposed transversely in the shell downstream of the horizontal baffles for directing the separated oil upwardly and longitudinally through the shell, a manifold disposed transversely in the shell and downstream of the baffle, a plurality of filter elements disposed in the manifold for filtering the separated oil, shell closure means to reverse the direction of the separated oil through the filter elements for additional filtering thereof, and oil outlet means in the shell communicating with the manifold.

References Cited in the file of this patent

UNITED STATES PATENTS

| Number | Name | Date |
|---|---|---|
| 652,155 | Wingrove | June 19, 1900 |
| 930,401 | Monteagle | Aug. 10, 1909 |
| 1,690,537 | Hele-Shaw et al. | Nov. 6, 1928 |
| 1,804,743 | Cannon | May 12, 1931 |
| 1,787,577 | Hills | Jan. 6, 1931 |
| 2,375,590 | Schonberg et al. | May 8, 1945 |
| 2,412,841 | Spangler | Dec. 17, 1946 |
| 2,525,154 | Taylor | Oct. 10, 1950 |
| 2,548,400 | Shepard | Apr. 10, 1951 |
| 2,550,853 | Nugent | May 1, 1951 |
| 2,609,932 | Fricke | Sept. 9, 1952 |
| 2,626,709 | Krieble | Jan. 27, 1953 |